United States Patent [19]
Yamada et al.

[11] Patent Number: 5,360,230
[45] Date of Patent: Nov. 1, 1994

[54] DAMPING FORCE CONTROL DEVICE FOR SUSPENSION SYSTEM

[75] Inventors: Naoki Yamada, Shimoyamamura; Junji Yamamoto, Toyota, both of Japan

[73] Assignee: Aisin Seiki Kabushiki Kaisha, Kariya, Japan

[21] Appl. No.: 801,419

[22] Filed: Dec. 2, 1991

[30] Foreign Application Priority Data

Nov. 30, 1990 [JP] Japan .................................. 2-334781
Nov. 30, 1990 [JP] Japan .................................. 2-334782

[51] Int. Cl.$^5$ ............................................. B60G 11/26
[52] U.S. Cl. ........................... 280/707; 188/314; 280/708; 280/714; 267/64.15
[58] Field of Search ................. 280/707, 708, 714; 267/64.15; 188/269, 314; 180/41

[56] References Cited

U.S. PATENT DOCUMENTS

| | | | |
|---|---|---|---|
| 4,624,476 | 11/1986 | Tanaka et al. | 280/708 |
| 4,625,994 | 12/1986 | Tanaka et al. | 280/708 |
| 4,639,014 | 1/1987 | Tanaka et al. | 280/708 |
| 5,020,825 | 6/1991 | Lizell | 280/707 |
| 5,107,969 | 4/1992 | Klein et al. | 280/707 |
| 5,208,749 | 5/1993 | Adachi et al. | 280/707 |

Primary Examiner—Eric Culberth
Attorney, Agent, or Firm—Burns, Doane, Swecker & Mathis

[57] ABSTRACT

A damping force control device for a suspension system of a vehicle includes a shock absorber having a fluid chamber therein and provided at each wheel side of the vehicle, an orifice device for supplying an amount of fluid into the fluid chamber, and a control device for controlling the opening of the orifice device based on the vertical speed above the shock absorber.

3 Claims, 13 Drawing Sheets

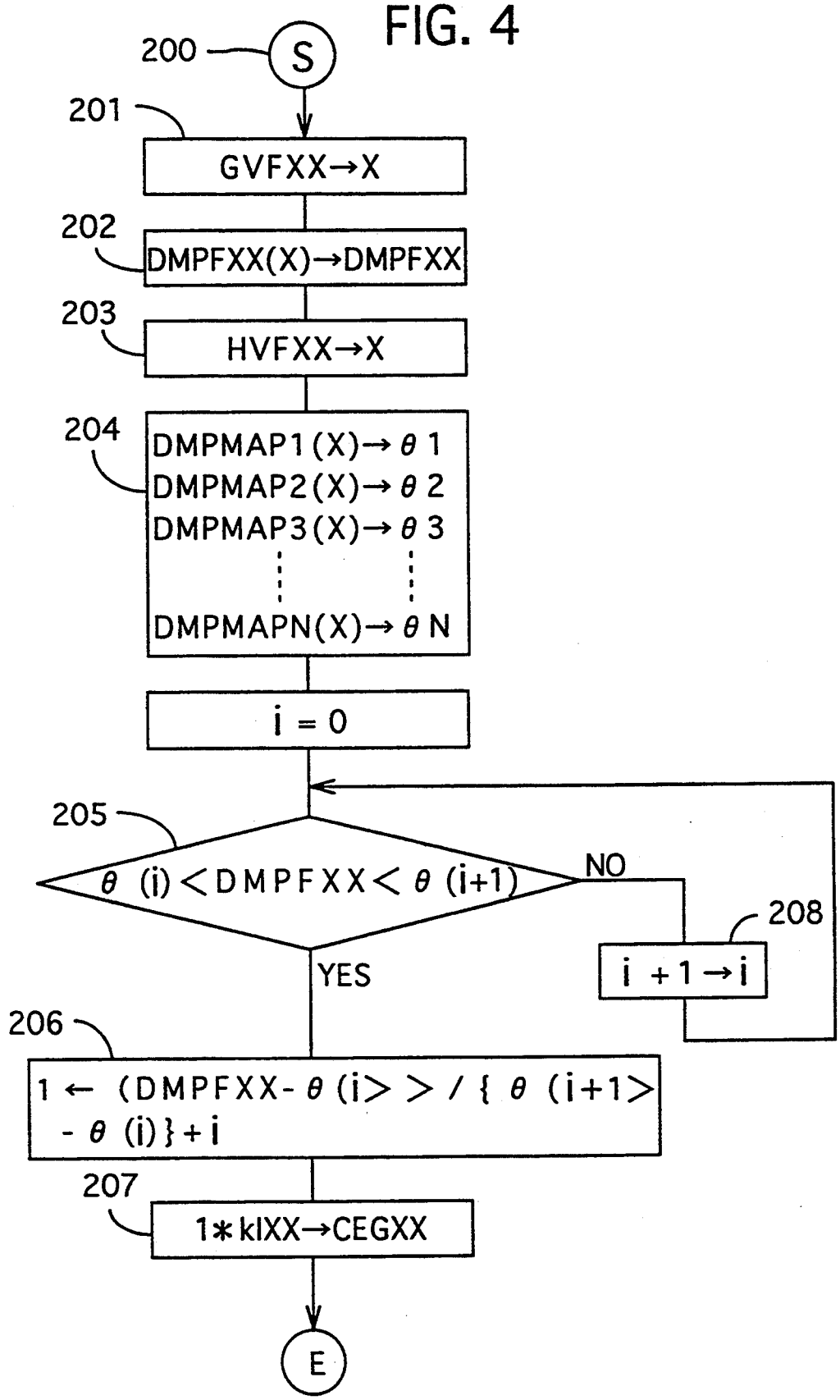

316

(1) ANTI-ROLL (2) ANTI-DIVING (3) BOUNDING (DSKY)

FIG. 11a
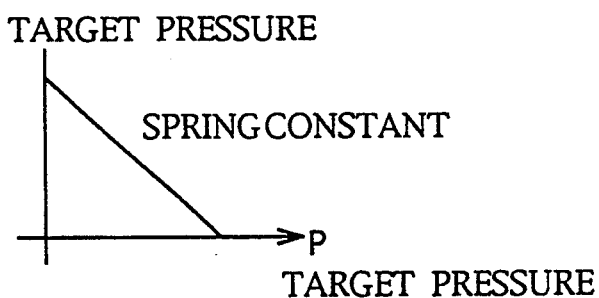
FIG. 11b
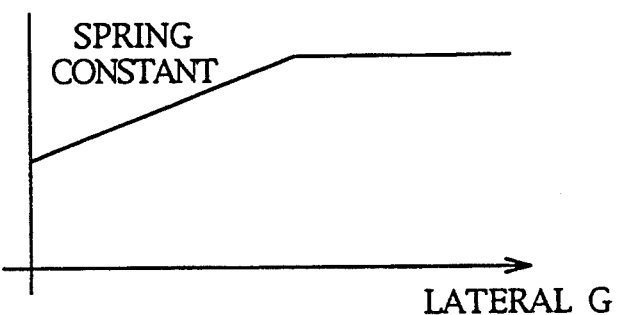
FIG. 12a (1) SELECTION OF (HIGH, NORM, LOW) BY SWITCHING
(+30, 0, −30mm)
FOR ADJUSTING VEHICLE HEIGHT
FIG. 12b (2) LINEAR CHANGE OF VEHICLE HEIGHT
BASED ON VEHICLE SPEED
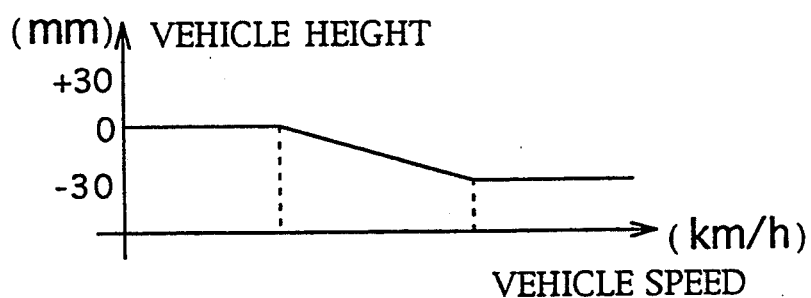
FIG. 12c (3) LINEAR CHANGE OF VEHICLE HEIGHT
BASED ON ROAD ROUGH LEVEL
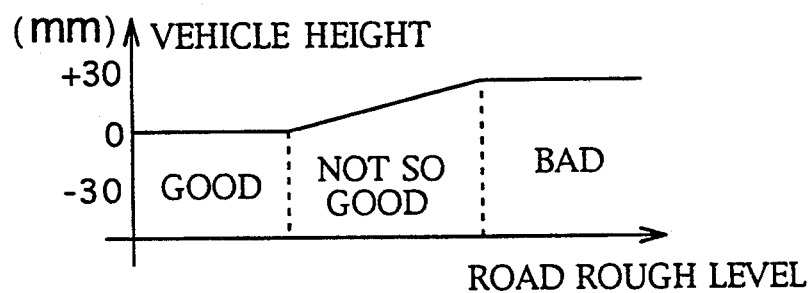

DAMPING FORCE CONTROL DEVICE FOR SUSPENSION SYSTEM

BACKGROUND OF THE INVENTION

The present invention relates to a damping force control device for use in a suspension system of a vehicle which serves for improving the ride quality and the steering stability of the vehicle.

In the conventional damping force control device, a shock absorber is set to be operated based on the vehicle speed and the vibrating condition of each wheel. This leads to poor ride quality in the vehicle since vibration is easily transmitted from the road surface to the vehicle body.

SUMMARY OF THE INVENTION

It is, therefore, a primary object of the present invention to provide a damping force control device for a suspension system of a vehicle without the foregoing drawback.

Another object of the present invention is to provide a damping force control device for a suspension system of a vehicle which is designed for preventing, as much as possible, the transmission of vibration from the road surface to the vehicle body.

In order to attain the foregoing objects, a damping control device for a suspension system in accordance with the present invention is comprised of a shock absorber having a fluid chamber therein and provided at each wheel side of the vehicle, an orifice means for supplying an amount of fluid to the fluid chamber, and a control means for controlling the opening of the orifice means based on the vertical speed above a suspension spring.

The foregoing and other objects, features and advantages of the invention will be apparent from the following description of the preferred embodiments of the invention as illustrated in the accompanying drawings.

BRIEF DESCRIPTION OF THE DRAWINGS

FIG. 4 is a flowchart showing the calculation of the target angle of a stepping motor;

FIGS. 11a and 11b are maps for obtaining the spring constant; and

FIGS. 12a-12c are maps to be used upon calculation of a vehicle-height.

DETAILED DESCRIPTION OF THE PREFERRED EMBODIMENTS

Figure 1:
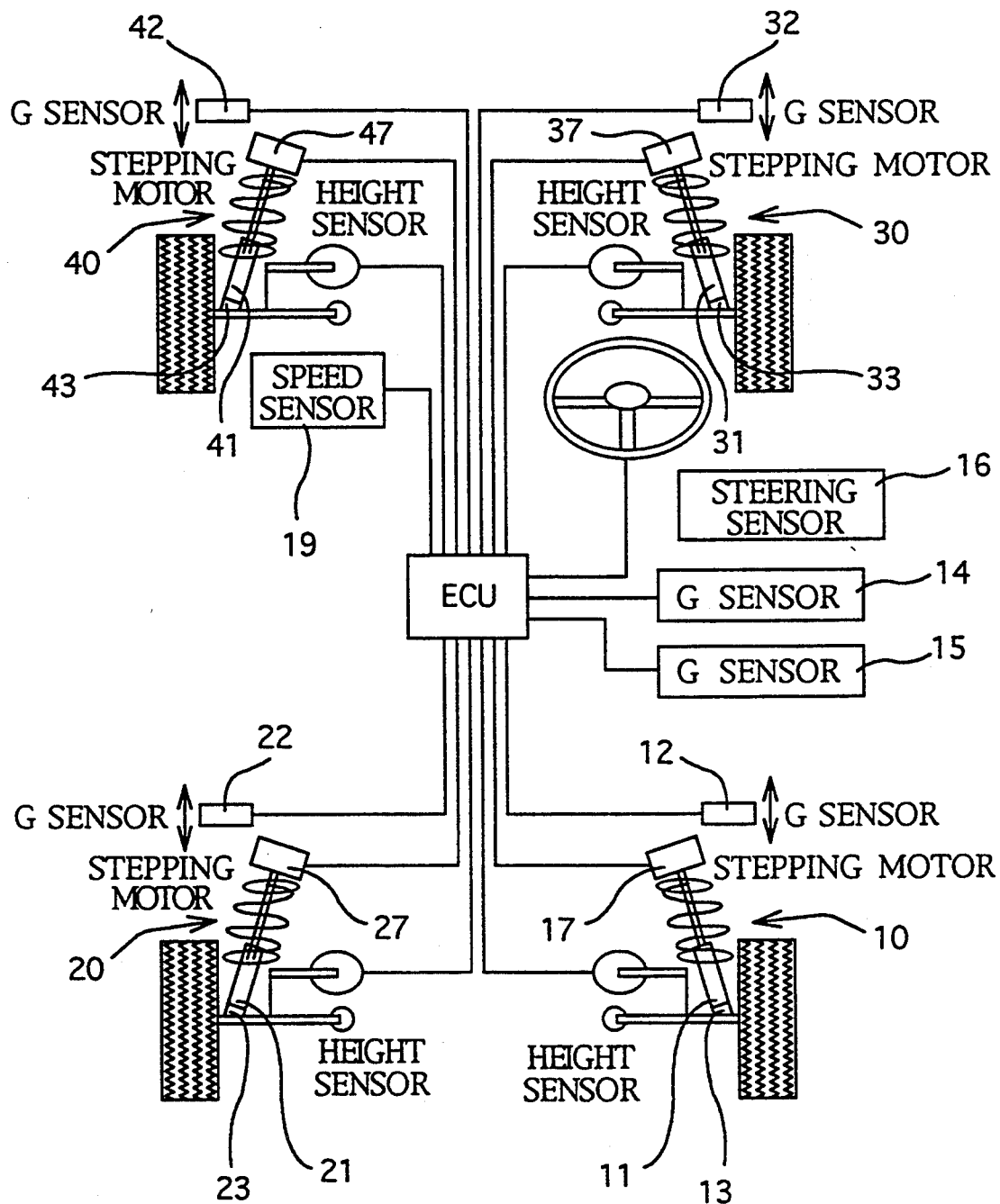
FIG. 1 is a schematic of a suspension system in which a damping force control device according to the present invention is accommodated.

Referring first to FIG. 1, there is illustrated a schematic diagram of a suspension system. The system includes a suspension device 10 provided at a rear right wheel side, a suspension device 20 provided at a rear left wheel side, a suspension device 30 provided at a front right wheel side and a suspension device 40 provided at a front left wheel side, each of which is independent from one another. Each suspension device 10 (20, 30, 40) has a shock absorber 11 (21, 31, 41) and is under the control of an ECU to which signals are set to be fed from a vertical G sensor 12 (22, 32, 42) of the suspension device 10 (20, 30, 40), a vehicle height sensor 13 (23, 33, 43) of the suspension device 10 (20, 30, 40), a lateral G sensor 14, a lengthwise G sensor 15, a vehicle speed sensor 19 and a steering sensor 16. The ECU is set to control a stepping motor 17 (27, 37, 47) for adjusting the orifice opening of each shock absorber 11 (21, 31, 41).

Figure 2A:
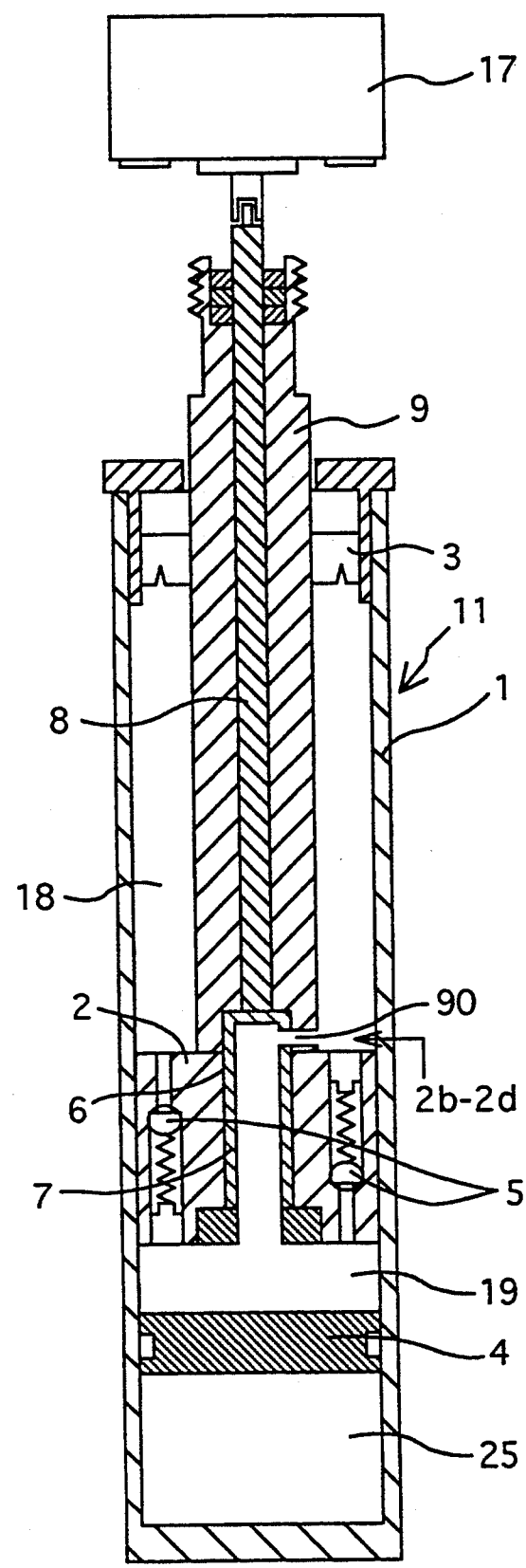
FIG. 2a is an elevational cross-sectional view of a shock absorber.
Figure 2B:
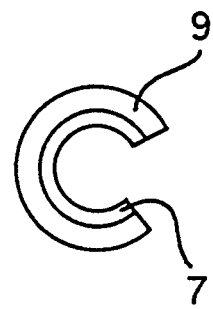
FIGS. 2b-2d illustrate three modes of the opening condition of an orifice.
Figure 2C:
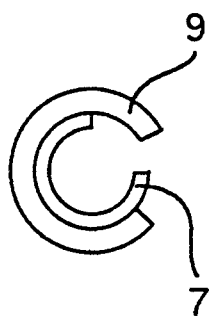
Figure 2D:
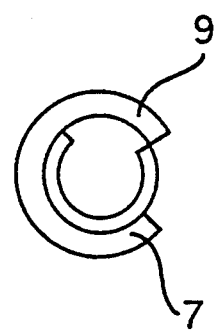

As illustrated in FIG. 2a, the shock absorber 11 has a casing 1 in which a piston 2 is slidably fitted. The piston 2 is fixedly connected to a rod 9 which extends in the outward direction of the casing 1. A seal member 3 is provided between the rod 9 and the casing 1. A free piston 4 is provided between the piston 2 and a bottom of the casing 1 and a space 25 into which an amount of air is filled is defined as an air cushion. A pair of relief valves 5 and 5 which are arranged in opposite directions to one another are provided in the piston 2 for the adjustment of pressure. An orifice 90 is formed in the piston 2 for establishing fluid communication between an upper chamber 18 and a lower chamber 19. The orifice 90 is set to be varied in its opening by rotating a valve member 7 which is operatively connected via a shaft 8 to the stepping motor 17 with the turning-on thereof. The damping force of the shock absorber 11 depends on the opening of the orifice 90. It should be noted that each of the shock absorbers 21, 31 and 41 is identical to the shock absorber 11 in construction and function. Thus, a detailed description or explanation of each of the shock absorbers 21, 31 and 41 will not be repeated.

Figure 3:
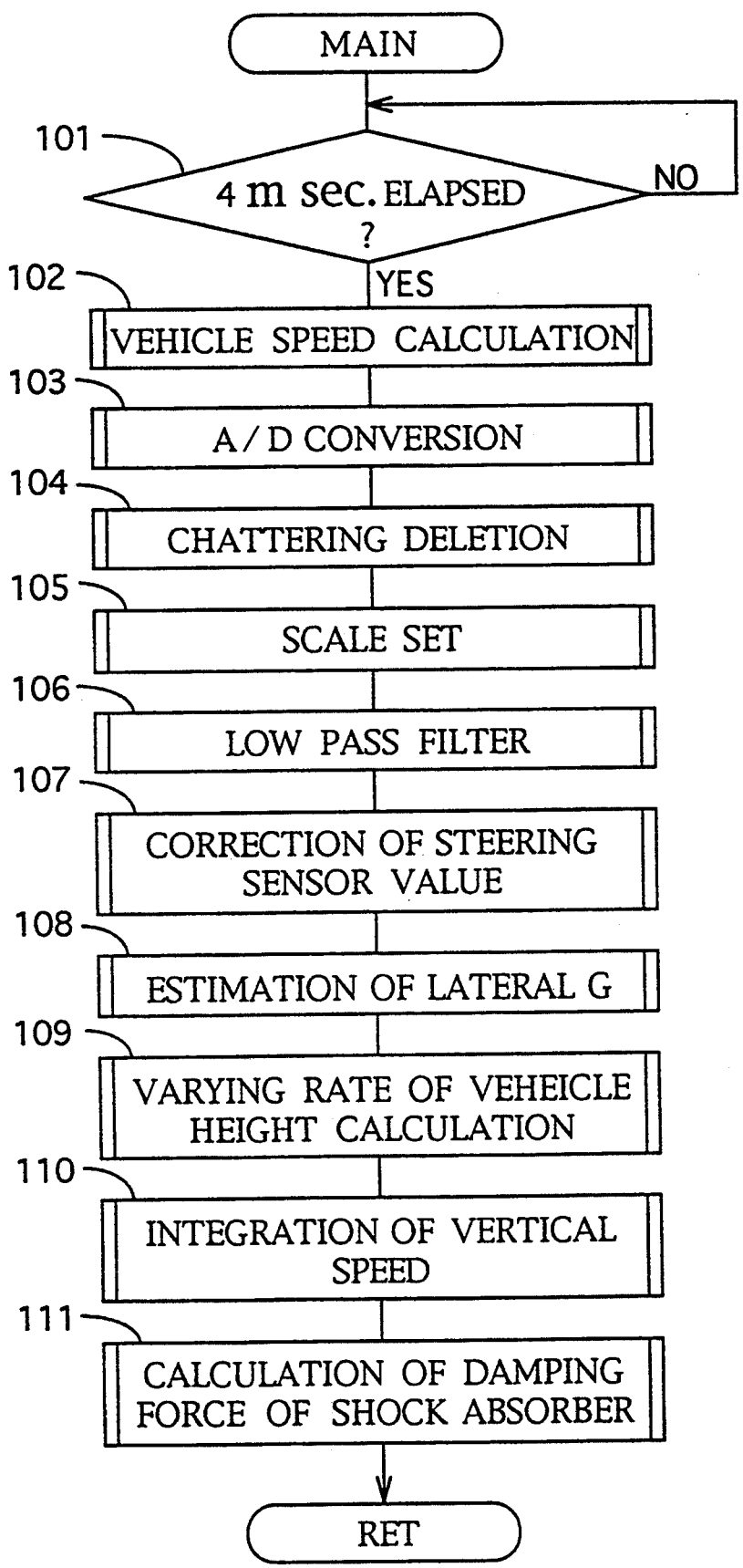
FIG. 3 is a general flowchart showing the control of a suspension system.
Figure 5A:
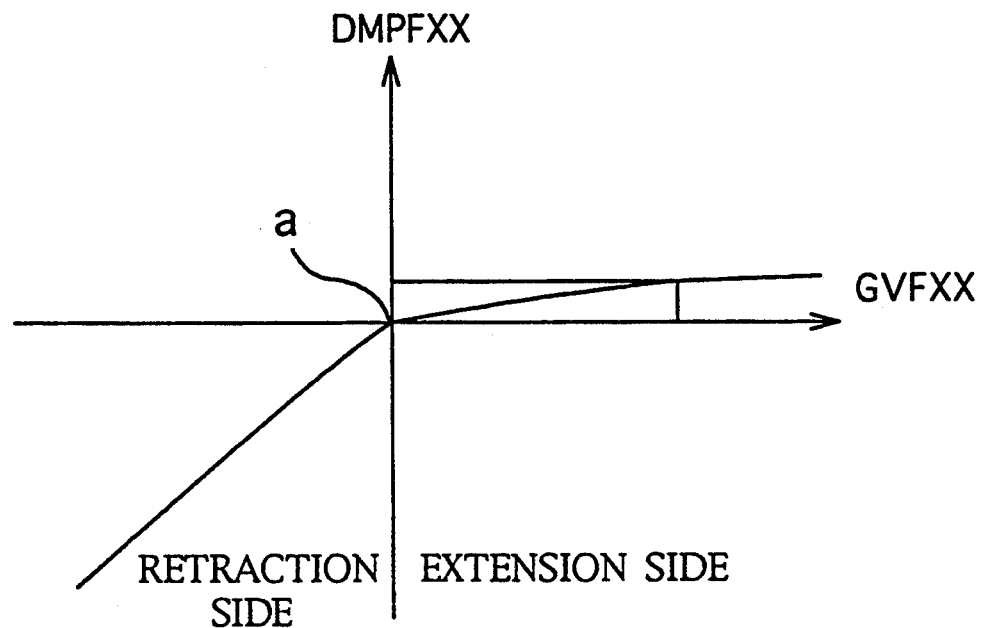
FIGS. 5a and 5b show maps to be referred to during calculation.
Figure 5B:
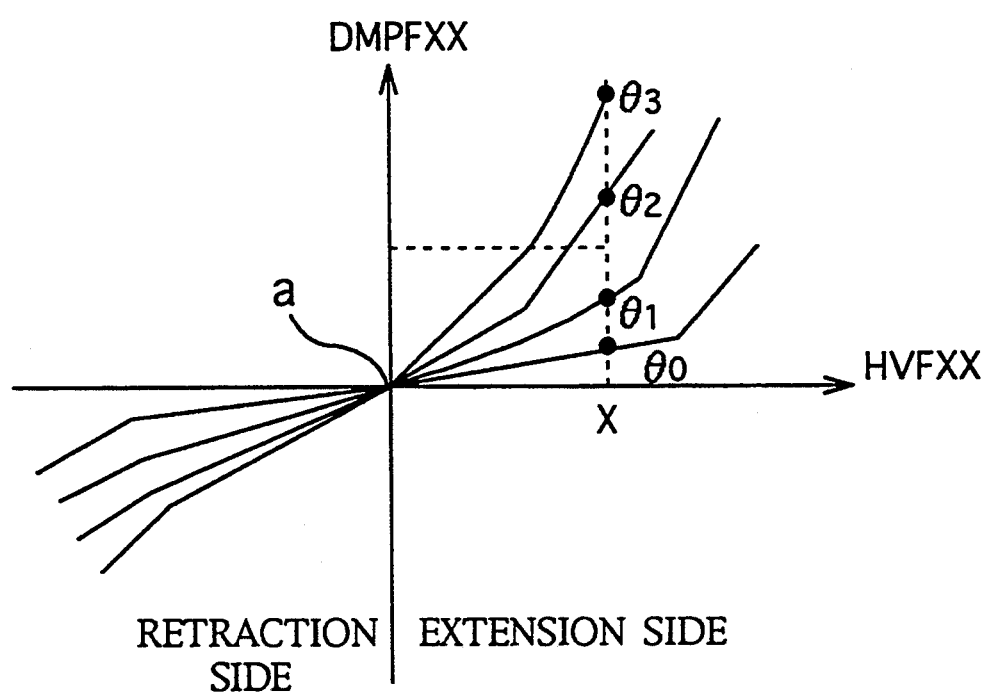

The control of the stepping motor 17 for adjusting the opening of the orifice 90 is established by way of the ECU which is illustrated in the flowchart shown in FIG. 3. With the passing of a time of 4 m sec. after initiation of the program in step 101, the vehicle speed is calculated in step 102 based on the vehicle speed sensor 19. After conversion of the detected speed from analog mode to digital mode in step 103, the chattering is deleted in step 104, a scale set is established in such a manner that the raw data from the sensor is converted into a corresponding digital value by using a specific function in step 105, and unnecessary signals are deleted through a low pass filter in step 106. In step 107, a value of the steering sensor is obtained by learning control for the correction of the steering. In step 108, the lateral G is set to be estimated based on the vehicle speed and the steering value. In step 109, the varying or changing rate or speed is calculated based on each displacement of the shock absorber which is obtained by the signal from each vehicle height sensor. In step 110, by the integral of signals from each vertical G sensor, the vertical speed above the suspension spring is calculated. In step 111, the damping force of the shock absorber is obtained which is in proportion to the vertical speed above the suspension spring with reference to a map shown in FIG. 5a. Then, for realizing the damping force of the shock absorber calculated in step 111, the corresponding opening of the orifice 90 is calculated with reference to another map shown in FIG. 5b before the stepping motor 17 is turned on. Thus, the damping force which is in proportion to the vertical speed above the suspension spring is obtained, which will be of less vibration.

In FIG. 4, there is illustrated a flowchart showing how the target angle of the stepping motor 17 which corresponds to the damping force to be sought or realized is determined. After the program starts in step 200, the vertical speed above the suspension spring is stored in a resistor which is represented as GVFXX where GVF means the vertical speed per se and XX means FL (front left), FR (front right), RL (rear left) and RR (rear right). In step 202, from the map shown in FIG. 5a, the damping force corresponding to the vertical speed above the suspension spring is calculated, and in step 203 the varying rate or speed of the shock absorber is calculated by differentiating the displacement of the shock absorber obtained by the vehicle height sensor. In step 204, from the map showing the relationship between the absorber varying rate and the absorber damping force, the orifice openings $\ominus 1, \ominus 2, \ldots \ominus n$ corresponding to the varying rate are obtained. After step 204 and before step 205, the value of i is set to zero. In steps 205 and 208, the damping force obtained in step 202 is determined to be positioned. That is to say, in FIG. 5b, in order to determine or seek a specific orifice opening corresponding to a damping force DMPFXX of "a", a sole or single range to which the damping force belongs is set to be selected from plural ranges each of which is defined as $(\ominus n - 63\ n+1)$ where $n=0,1 \ldots$. If the range or the orifice opening is determined to be between $\ominus 1$ and $\ominus 2$, step 206 is executed wherein the correction will be made for obtaining a precise orifice opening. In step 207, the resulting precise orifice opening is replaced with the corresponding target angle of the stepping motor 17 and the execution is terminated. The calculation of the target angle of the stepping motor 17 is established for each suspension device in order to realize an independent suspension mode.

Figure 6:
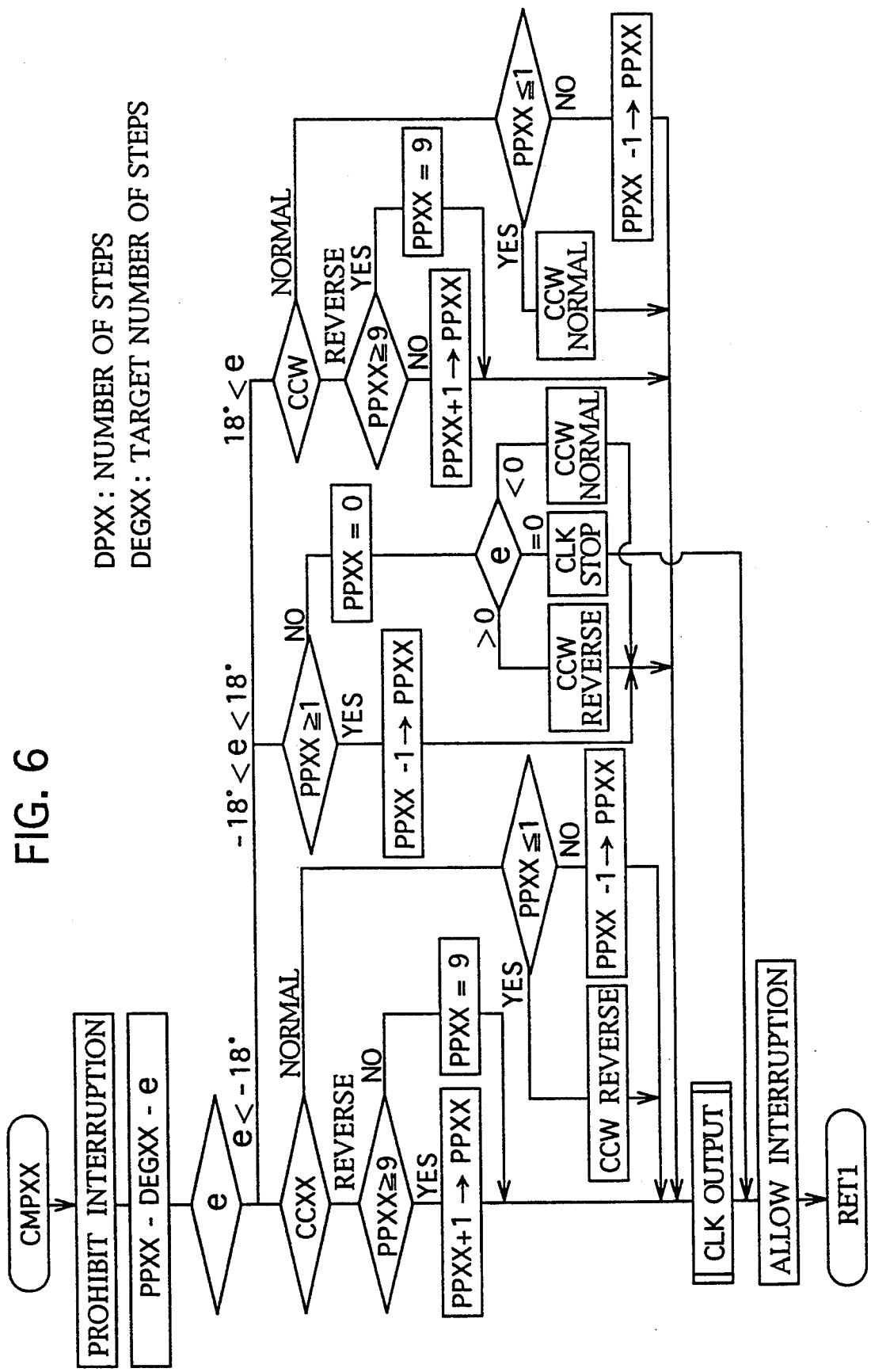
FIG. 6 is a flowchart showing the control of a stepping motor.
Figure 7:
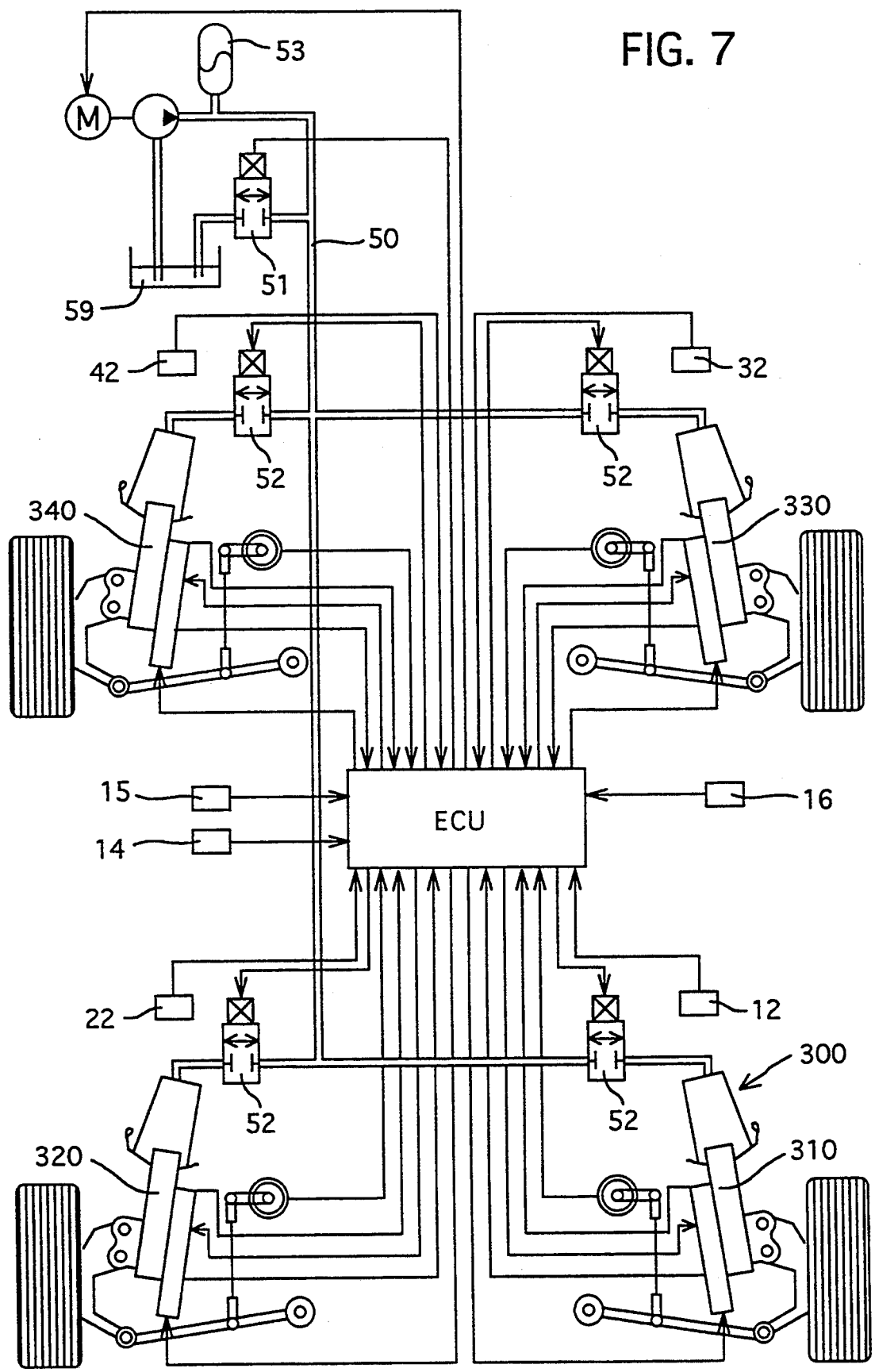
FIG. 7 is a schematic illustration of a suspension system in which another damping force control device according to the present invention is accommodated.

As to how to drive or turn on the stepping motor 17 in order to realize or catch up with the calculated target angle as fast as possible, the following manner is employed in this embodiment. That is to say, if the deviation between the target angle and the current angle of the stepping motor 17 is more than 10 steps (about 18 degrees) under the condition that the vehicle speed is less than 1000 PPS (pulses per second), an acceleration control is set. If the deviation is more than 10 steps (about 18 degrees) under the condition that the vehicle speed is equal to 1000 PPS (pulses per second), a constant speed control is set. If the deviation is less than 10 steps (about 18 degrees), a deceleration control is set. If the deviation is less than 2 steps, the control is set to terminate the stepping motor 17. In FIG. 6, an example of the control of the stepping motor 17 is shown in the form of a flow chart.

As mentioned above, in the foregoing embodiment, the damping force is set to be increased (decreased) in the direction of the retraction (extension) of the shock absorber 10 (20, 30, 40) without additional energy. In addition, the adjustment of the orifice opening is established in a step-by-step manner, thereby enabling precise control.

As an improved modification of the foregoing embodiment, the second embodiment of the present invention will be described hereinafter with reference to FIGS. 7 through 12. In brief, the second embodiment is set to vary the constant of the air spring in the shock absorber.

Referring to FIGS. 7, 8a, 8b, 8c and 8d a shock absorber 310 of a suspension device 300 is in fluid communication with an accumulator 53 via a passage 50 that includes a cut-off valve 52. Also, a passage between the accumulator 53 and the cut-off valve 52 is fluidly connected to the reservoir 59 via a return valve 51. Thus, upon opening the cut-off valve 52 under the closure of the return valve 51, fluid is supplied to the shock absorber 310 for raising the vehicle height. If both valves 51 and 52 are opened, the fluid is returned to the reservoir 59, which results in the lowering of the vehicle height.

Figure 8A:
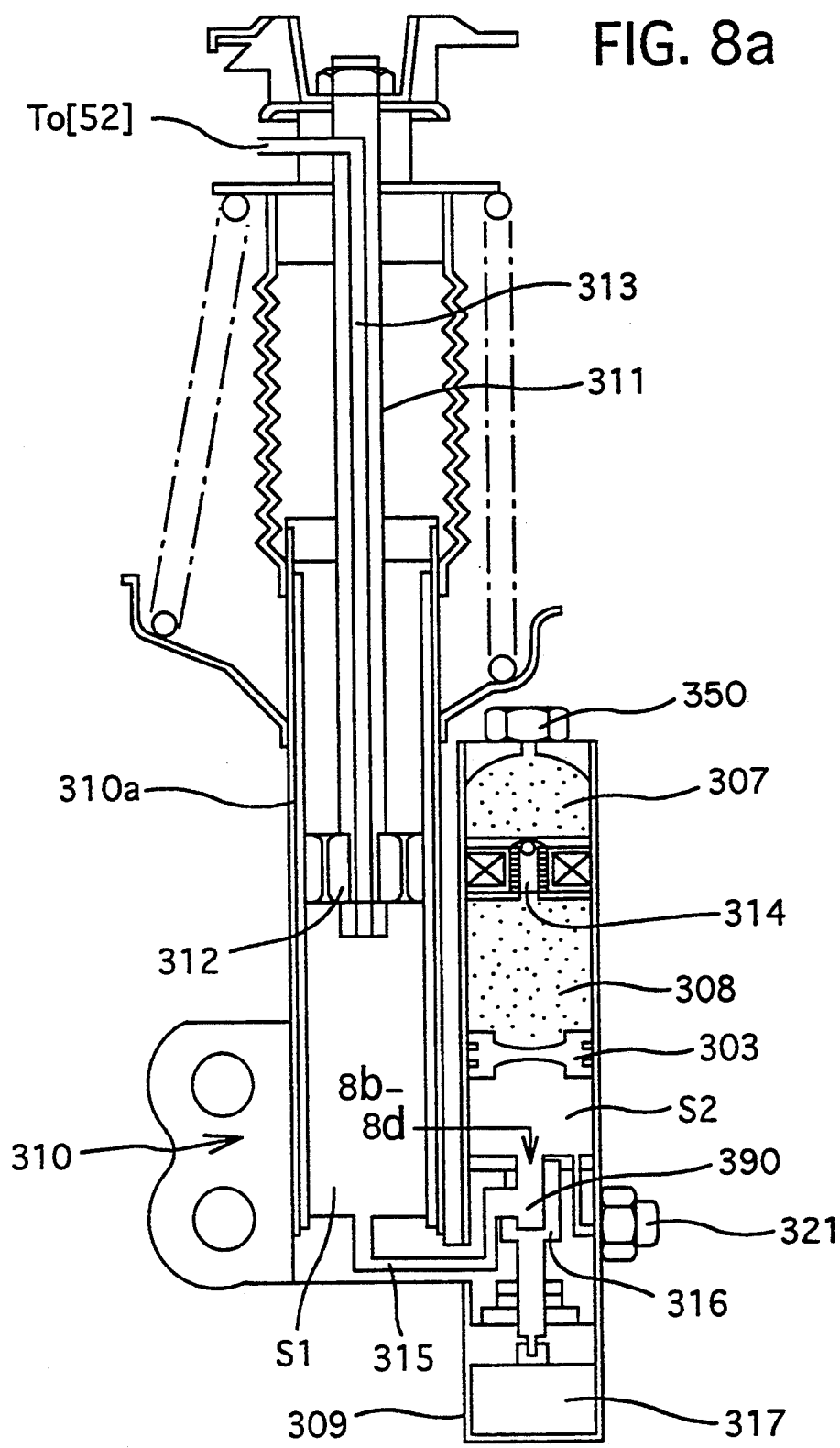
FIG. 8a is an elevational cross-sectional view of another shock absorber.
Figure 8B:
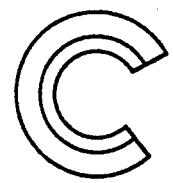
FIGS. 8b-8d illustrate three modes of the opening condition of an orifice of another shock absorber.
Figure 8C:
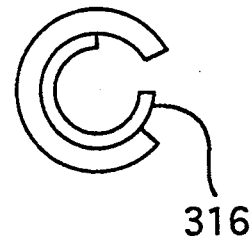
Figure 8D:
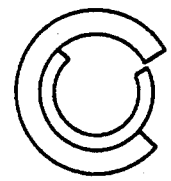
Figure 9A:
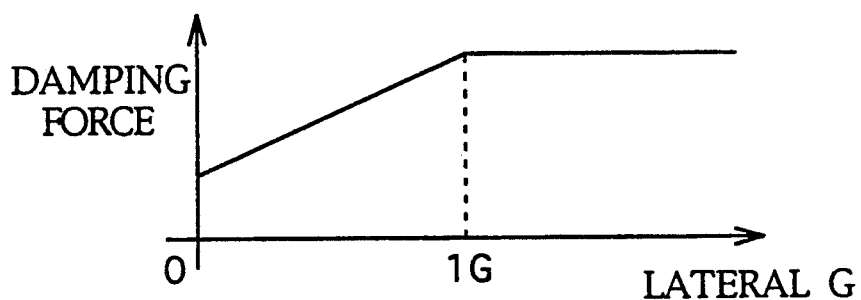
FIGS. 9a-9c illustrate target damping force maps.
Figure 9B:
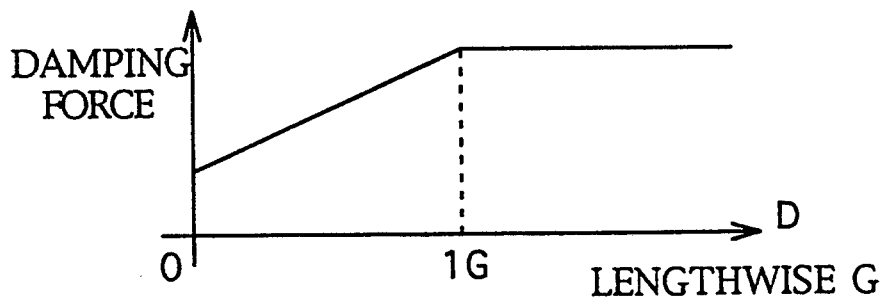
Figure 9C:
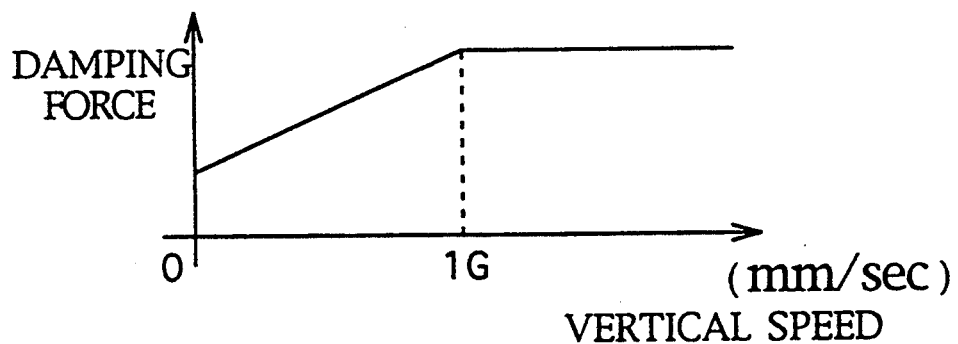
Figure 10:
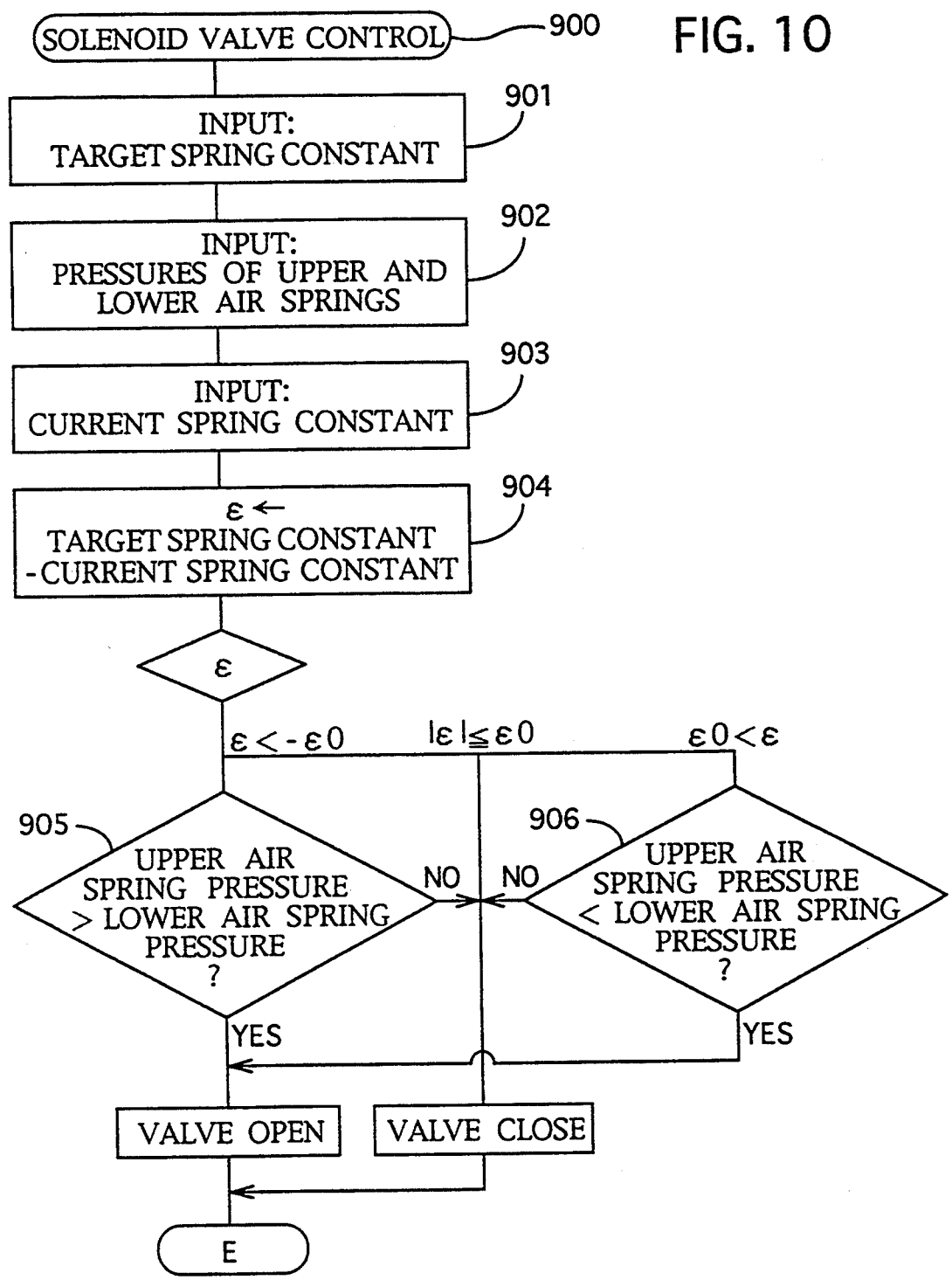
FIG. 10 is a flowchart showing the control of the spring constant of an air spring.

The shock absorber 310 has a casing 310a wherein a piston 312 with a rod 311 is slidably fitted. In the rod 311, a passage 313 is formed for supplying an amount of fluid from the passage 50 to a chamber S1. When the cut-off valve 52 is opened after the closure of the return valve, fluid is supplied into the chamber S1, thereby raising the piston 312 in the vertical direction. This raising of the vehicle height is established by using a previously prepared map as shown in FIG. 12 depending on various conditions. Another casing 309 is connected to the casing 310a and a chamber S2 is defined in the casing 309 which is in fluid communication with the chamber S1 via a passage 315. In the chamber S2, there is positioned a pressure sensor 321. In the passage 315, a rotary valve 316 is provided for defining an orifice 390. The valve 316 is set to be rotated by a stepping motor 317 and serves for adjusting the orifice opening as shown in FIGS. 8b–8d, which leads to the control of the damping force.

In addition, at an upper side of the chamber S2 in the casing 309, a free piston 303 is located. Above the free piston 303, an upper air spring 307 and a lower air spring 308 are formed across a solenoid valve 314. A pressure sensor 350 is located in the upper air spring 307. The spring constant of the air spring as a whole is set to be controlled as mentioned below. That is to say, with reference to the flowchart shown in FIG. 10, upon initiation of the solenoid control in step 900, a target spring constant is inputted which is obtained by the maps shown in FIGS. 11a and 11b in step 901. In the next step, step 902, a pressure PO of the upper air spring 307 and a pressure P1 of the lower air spring 308 are inputted. It is noted that the latter is identical to a pressure in the chamber S2 which allows the use of an output of the pressure sensor 321 as the latter. Thus, in step 903, the current spring constant is calculated. In step 904, a deviation ε between the target spring constant of the air spring and the current spring constant of the air spring is calculated and the resulting value ε is checked to determine whether it exceeds a value or not. If it is regarded as hard, in step 905 (906), so long as the upper air spring 308 is greater than the lower air spring 307 in pressure (the lower air spring 307 is greater than the upper air spring 308), the solenoid valve 314 is opened for adjusting the spring constant of the air spring as a whole.

In this embodiment, a suitable spring constant of the air spring can be obtained depending on the road condition. Particularly, the spring constant of the air spring can be adjusted in a linear mode. It should be noted that the second embodiment is able to function for adjusting the damping force similar to the first embodiment though the function is not detailed.

It should be apparent to one skilled in the art that the above-described embodiments are merely illustrative of but a few of the many possible specific embodiments of the present invention. Numerous and various arrangements can be readily devised by those skilled in the art without departing from the spirit and scope of the invention as defined in the following claims.

We claim:

1. A hydraulic shock absorber for a suspension system of a vehicle comprising:

a first cylinder;

a first piston slidably fitted in the first cylinder and defining a first chamber within the first cylinder;

a second cylinder;

a free piston slidably fitted in the second cylinder, said free piston defining a second chamber within the second cylinder that is located under the free piston;

a passage for establishing hydraulic communication between the first chamber and the second chamber;

adjustable opening orifice means disposed in the passage for controlling the hydraulic communication between the first chamber and the second chamber in order to adjust a damping force of the hydraulic shock absorber;

air spring means positioned in the second cylinder for adjusting a spring constant of the hydraulic shock absorber based on prevailing road conditions, said air spring means including a lower air spring positioned above the free piston, an electrically operated solenoid valve positioned above the lower air spring and an upper air spring positioned above the solenoid valve; and control means for opening and closing the solenoid valve.

2. A hydraulic shock absorber as set forth in claim 1, wherein the control means controls the solenoid valve in accordance with a map which sets forth a relationship between the prevailing road conditions and a corresponding spring constant of the hydraulic shock absorber.

3. A hydraulic shock absorber as set forth in claim 1, including a pressure sensor operatively associated with the upper air spring and a pressure sensor operatively associated with the lower air spring.

* * * * *